(12) United States Patent
Kostic et al.

(10) Patent No.: US 7,639,732 B2
(45) Date of Patent: Dec. 29, 2009

(54) INTELLIGENT CODE TRACKING FOR SPREAD SPECTRUM SYSTEMS

(75) Inventors: Zoran Kostic, Holmdel, NJ (US); Louis Robert Litwin, Plainsboro, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 493 days.

(21) Appl. No.: 10/576,966

(22) PCT Filed: Nov. 4, 2003

(86) PCT No.: PCT/US03/35085

§ 371 (c)(1),
(2), (4) Date: Apr. 25, 2006

(87) PCT Pub. No.: WO2005/048480

PCT Pub. Date: May 26, 2004

(65) Prior Publication Data

US 2007/0081579 A1    Apr. 12, 2007

(51) Int. Cl.
   *H04B 1/707*   (2006.01)
   *H04B 1/10*   (2006.01)
(52) U.S. Cl. .......................... 375/149; 375/350
(58) Field of Classification Search .............. 375/144, 375/145, 148, 149, 232, 350, 354, 375, 326, 375/327, 376; 708/322, 323
See application file for complete search history.

(56) References Cited

U.S. PATENT DOCUMENTS

| 5,486,792 | A | * | 1/1996 | Girardeau, Jr. ............... 331/10 |
| 5,737,362 | A | | 4/1998 | Hyun et al. |
| 6,516,021 | B1 | | 2/2003 | Abbott et al. |
| 2001/0020216 | A1 | | 9/2001 | Lin |
| 2002/0057729 | A1 | | 5/2002 | Farbod et al. |
| 2004/0044713 | A1 | * | 3/2004 | Healey et al. ............... 708/322 |
| 2004/0088609 | A1 | * | 5/2004 | Eckhardt et al. ............ 714/700 |

FOREIGN PATENT DOCUMENTS

| JP | 5-227123 | 9/1993 |
| JP | 10-56402 | 2/1998 |
| JP | 2002-290279 | 10/2002 |
| WO | WO 01/22611 A1 | 3/2001 |
| WO | WO 01/50631 A2 | 7/2001 |
| WO | WO 02/19556 A2 | 3/2002 |

* cited by examiner

*Primary Examiner*—Don N Vo
(74) *Attorney, Agent, or Firm*—Robert D. Shedd; Robert B. Levy; Jeffrey D. Hale

(57) ABSTRACT

A code-tracking system includes a loop filter, which receives an early/late error signal and outputs a loop filter error signal. An error scaling device receives the loop filter error representing an update and provides a code tracking adjustment signal. A controller monitors a frequency of updates and/or a number of same direction updates and provides a filter coefficient in accordance with the frequency of updates and/or the number of same direction updates.

19 Claims, 2 Drawing Sheets

INTELLIGENT CODE TRACKING FOR SPREAD SPECTRUM SYSTEMS

This application claims the benefit, under 35 U.S.C. § 365 of International Application PCT/US2003/035085, filed Nov. 4, 2003, which was published in accordance with PCT Article 21(2) on May 26, 2005, in English.

FIELD OF THE INVENTION

The present invention generally relates to network communications systems and more particularly to a system and method which provides for intelligent gear-shifting of loop filter coefficients in spread-spectrum code-tracking transmission/receiver systems.

BACKGROUND OF THE INVENTION

Spread spectrum code tracking, for example wideband code division multiple access (WCDMA) tracking, is employed in many network communications systems. After a spread spectrum receiver has performed initial acquisition to a cellular base station, one of the many tasks of the receiver is to keep its local spreading code reference locked to the transmitted spreading code. These codes must be locked in time for the receiver to be able to generate meaningful correlations. Typically, a phase-locked loop (PLL) is used to control the code tracking operation. This operation must run continuously to track the code because of changes in the channel environment and clock drift. Typical loops have a need for intelligence and in setting loop filter coefficients.

Typical code tracking blocks use a technique known as the early-late gate algorithm. The basic idea of this algorithm is illustrated in FIG. 1. A receiver's correlator will generate three samples. A middle sample 12 is known as the on time sample and is generated by correlating a received signal against a receiver's estimate of a proper code timing reference. Two other samples 10 and 14 are known as early and late samples, and are generated by correlating the received signal against shifted versions of the receiver's code. Typically, the early sample is formed by shifting the receiver's code by a fraction of a chip earlier than it should be, and the late sample is formed by shifting the code later than it should be.

If the receiver's code reference is perfectly synchronized, the result will be samples that look like the "Perfectly Synchronized" left portion 16 of FIG. 1. The early and late samples will be at exactly the same height (due to the symmetrical shape of the pulse shaping filters in the system) and the on-time sample will be larger than both the early and late samples. However, in the presence of a timing offset, the result looks like the "out of synch" or right portion 18 of FIG. 1.

Of importance is the fact that the quantity: error=early–late is non-zero. The error for the loop is generated as a difference in the amplitude between the early and late samples. The magnitude and sign of this error can be used to drive a code-tracking loop. If the code is far off, for example, it may take a relatively long time to correct.

Therefore, a need exists for a method of intelligent adaptation of filter coefficients to correct code tracking. A further need exists for a method and system, which provides intelligence to the code-tracking algorithm to offer improved performance.

SUMMARY OF THE INVENTION

A code-tracking system includes a loop filter, which receives an early/late error signal and outputs a loop filter error signal. An error scaling device receives the loop filter error representing an update and provides a code tracking adjustment signal. A controller monitors a frequency of updates and/or a number of same direction updates and provides a filter coefficient in accordance with the frequency of updates and/or the number of same direction updates.

A method for code-tracking in spread spectrum systems, includes the steps of modifying a count after each update of a loop filter output, comparing the count to a user-defined threshold and if the count does not exceed the user-defined threshold and if a code tracking adjustment value is non-zero, changing loop filter coefficients to synchronize received signals.

Another method for code-tracking in spread spectrum systems, includes modifying a count after a number of same direction updates of a loop filter output, comparing an absolute value of the count to a user-defined threshold and if the absolute value exceeds the user-defined threshold, changing loop filter coefficients.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a method and system for intelligent "gear-shifting" of loop filter coefficients in a code-tracking system for use in spread-spectrum systems. The intelligence permits the method and system to determine if code tracking is slipping rapidly or if code tracking is constantly updating in a given direction.

The present invention adds intelligence to the standard code tracking loop to improve performance and illustratively described two techniques: a frequency technique and a direction technique. Both techniques are used to adjust, or gear-shift, the values of the loop filter coefficients. Small values of the coefficients make for a more stable loop, but the loop will be unable to track large changes in code timing. Large values of the coefficients will enable the loop to track large code timing offsets, but the loop may be noisy and will jitter around.

It is to be understood that the present invention is described in terms of a wideband code division multiple access system; however, the present invention is much broader and may include any broad-spectrum system, which needs code tracking of a transmitted sequence to prevent drift or other effects. In addition, the present invention is applicable to any transmission/receiver system including cellular, telephone, cable, satellite, radio systems/networks, etc. In one embodiment, the present invention is employed in code division multiple access (CDMA) applications in receivers for stations and mobile units.

It should be understood that the elements shown in the FIGS. may be implemented in various forms of hardware, software or combinations thereof. Preferably, these elements are preferably implemented in a combination of hardware and software on one or more appropriately programmed general-purpose devices, which may include a processor, memory and input/output interfaces.

The present invention adds intelligence to standard spread spectrum code tracking loops to improve performance by intelligently gear-shifting the gains of the loop filter coefficients. In the frequency technique, gains are adjusted when the code tracking updates very frequently (based on a user-defined threshold). In the direction technique, gains are adjusted when the code tracking updates several times in the same direction (based on a user-defined threshold).

Figure 1:
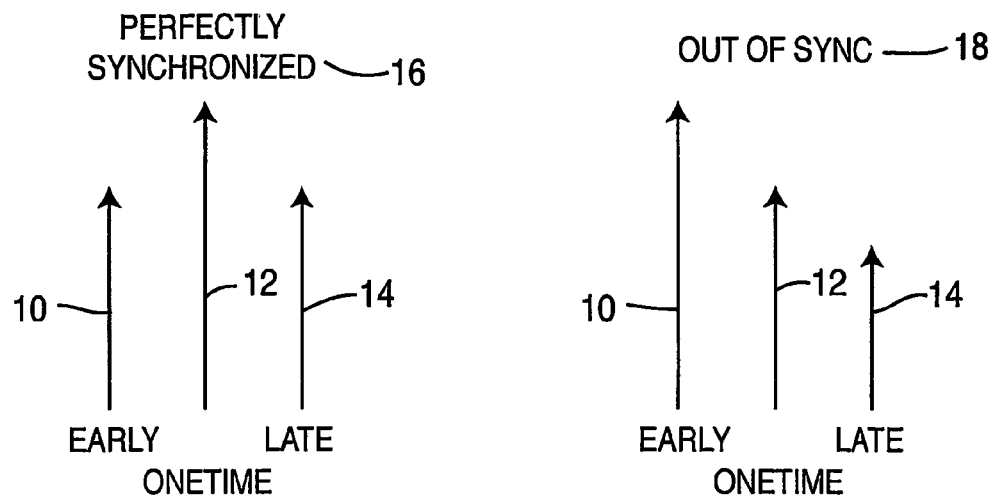
FIG. 1 is an example of early-late code tracking where an error is generated by a difference in amplitude between the early and late samples.
Figure 2:
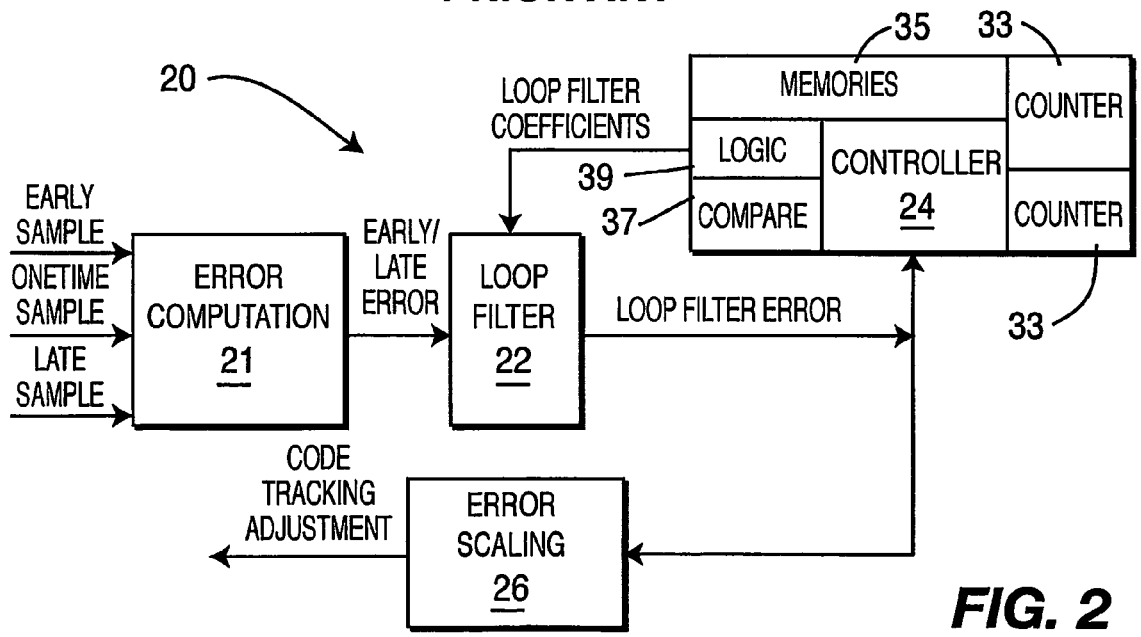
FIG. 2 is a block diagram of an illustrative code tracking system in accordance with one embodiment of the present invention.

Referring now in specific detail to the drawings in which like reference numerals identify similar or identical elements throughout the several views, and initially to FIG. 2, a code tracking loop 20 is shown in accordance with one embodiment of the present invention. The loop 20 works as follows. An error computation block 21 computes the quantity error (error=early−late). The error for the loop is generated as a difference in the amplitude between the early and late samples. The magnitude and sign of this error can be used to drive a code tracking loop. This error is then passed through a loop filter 22. An example architecture of a loop filter 22 is shown in FIG. 3.

Figure 3:
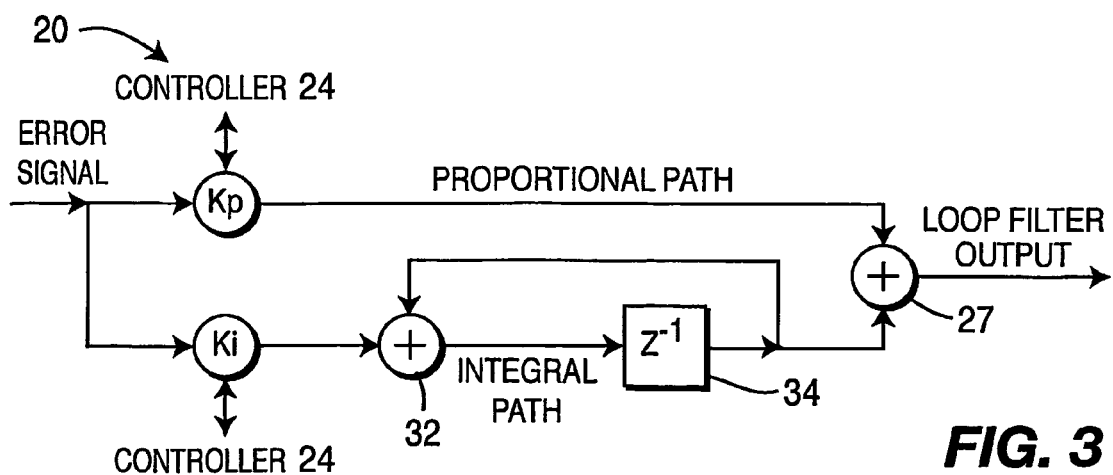
FIG. 3 shows architecture for a loop filter for code tracking system in accordance with one embodiment of the present invention.

Referring to FIGS. 2 and 3, filter 22 has two coefficients, $K_p$ and $K_i$. $K_p$ is the gain of the proportional section of the loop filter and that section's output is a scaled version of the input error. $K_i$ is the gain of the integral section of the loop filter 22 and the output of that section is formed by scaling the input error and integrating the input error using the loop filter 22 and a controller 24. The overall output of the loop filter 22 is formed by adding the outputs of the proportional and integral stages together with an adder 27. Next, the output of the loop filter is scaled in error scaling 26 and the integer part of the scaled error is used to update the receiver's code reference. The integral path output includes adding (by an adder 32) the error signal filtered with coefficient $K_i$, and feedback output after a single unit delay 34.

In accordance with the invention, the code tracking adjustment output from error scaling 26 is reported to controller 24. In the event, that a number of updates (e.g., code tracking adjustment is needed at a particular frequency) exceeds a user-defined frequency rate, then the controller 24 assigns new filter coefficient values to loop filter 22 and the gains are thereby adjusted when the code tracking updates very frequently (based on the user-defined threshold). In the event, that a number of updates are needed in a particular direction, gains are adjusted when the code tracking updates several times in the same direction (based on a user-defined threshold).

Controller 24 may include a number of different coefficients and selectively assign the coefficients to loop filter 22 in accordance with feedback from error scaling. Controller 24 may include one or more counters 33, which track the number of adjustments made and compare the counts with user-defined thresholds stored in programmable memory 35. The thresholds in memory 35 are compared with counter values by comparators 37. Memory 35 may also store a plurality of filter coefficients and logic 39 for determining optimal coefficients to be assigned under the current operational conditions.

Figure 4:
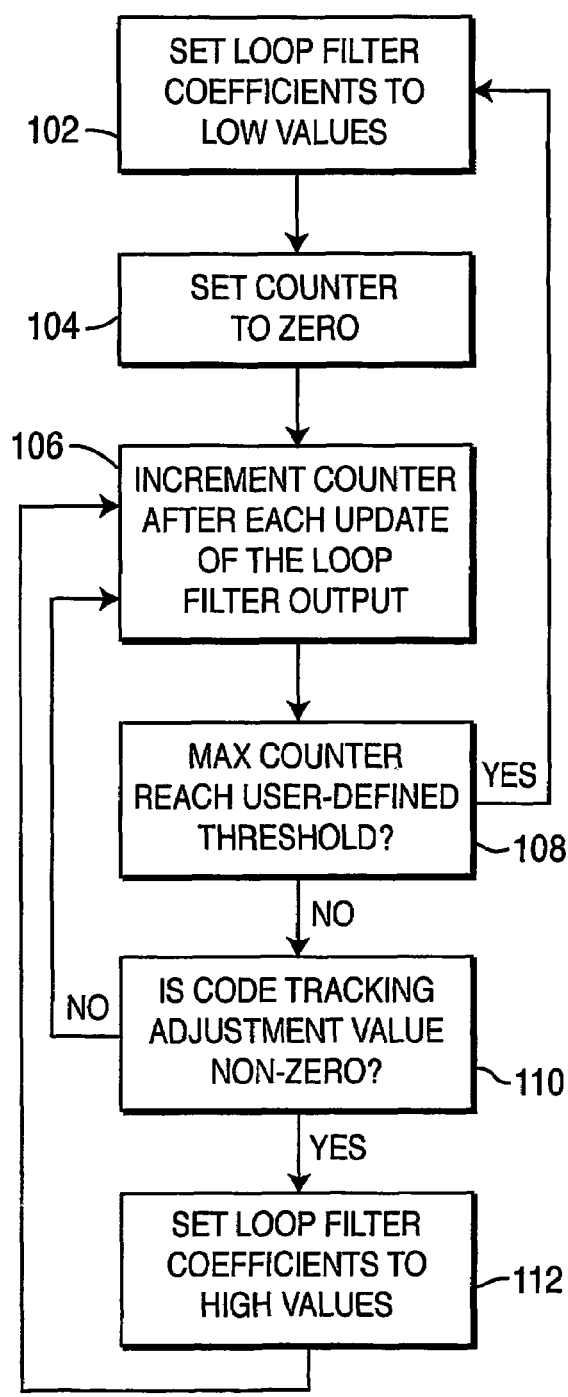
FIG. 4 is a block/flow diagram of a frequency method for code tracking in accordance with one embodiment of the present invention.

Referring to FIG. 4 a block/flow diagram describing a Frequency Technique in accordance with one embodiment of the present invention is depicted. The frequency technique adds logic that monitors a frequency of changes in the receiver's code tracking reference. A counter is initialized to zero, and each time the loop filter output is computed, this counter will increment. If, after error scaling, the code tracking adjustment value is non-zero and the counter has not yet reached a user-defined threshold, then the gains of the loop filter coefficients will be increased. If the loop is adjusting code tracking frequently (where "frequently" is defined by the user-defined threshold), then the gains should be increased to enable the loop to track the more rapid changes. If the counter is later able to reach its user-defined threshold without having any updates to code tracking, then the gains of the loop filter will be set back to their original smaller values.

In block 102, loop filter coefficients are set to low or initial values, and the counter is initialized to zero in block 104. During operation, the counter is incremented after each update of the loop filter output, in block 106. In block 108, a user-defined threshold is employed and compared to the count of the counter to determine if the loop filter coefficients should be restored to their initial values (block 102) and reinitialize the counter to zero (block 104). If the user-defined threshold is not yet reached, a check is performed to determine if the code tracking adjustment value is non-zero in block 110. If this value is non-zero, adjustment is needed. Depending on the magnitude and direction of the difference from zero for the adjustment value, filter coefficients are selected in block 112. The filter coefficients may include higher or lower values depending on the availability of coefficients. For example, a much higher coefficient may be employed if the adjustment value is off by a substantial amount or a slightly higher (or even lower) coefficient may be selected to filter the signals through the loop filter. The coefficients are then continuously updated and provide a more rapid convergence to zero adjustment value if high frequency updates are needed.

Figure 5:
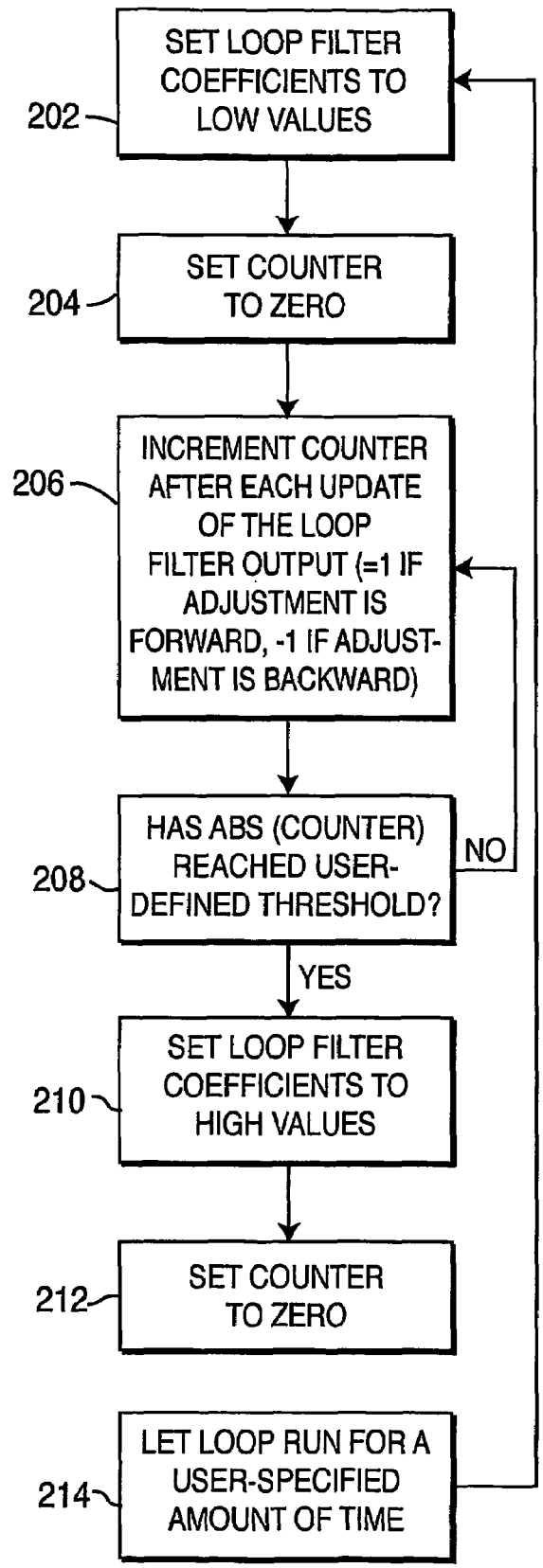
FIG. 5 is a block/flow diagram of a direction method for code tracking in accordance with one embodiment of the present invention.

Referring to FIG. 5, a block/flow diagram describing a Direction Technique in accordance with one embodiment of the present invention is depicted. This embodiment provides logic that monitors the direction of changes in the receiver's code tracking reference. A counter is initialized to zero. Each time the loop filter output is computed, this counter will increment or decrement by one based on the direction of the adjustment. For example, if the adjustment of the code tracking reference is forward in time, the counter will increment by one, and if the adjustment is backwards in time, the counter will decrement by one. Under normal operations, the adjustment will jitter back and forth but the value of the counter will have a mean of zero. However, under some situations in which code timing is rapidly changing (e.g., too fast for the code tracking loop to keep up) the adjustments will be in the same direction and in this case, the counter will reach a large positive or negative value.

If the absolute value of the counter reaches a user-defined threshold, then it may be assumed that the receiver is in a situation where the code timing is rapidly drifting and then the gains of the loop filter are increased to enable the loop to track the rapid drift. At this time, the counter is reset to zero. Later, if the counter values stay within a user-defined region around zero, the gains can be reset to their original lower values.

In block 202, loop filter coefficients are set to low or initial values, and the counter is initialized to zero in block 204. During operation, the counter is incremented after each update of the loop filter output, in block 206. The filter output includes a +1 increment if the adjustment is forward and a −1 decrement if the adjustment is backwards. In block 208, a check is performed to determine if the absolute value of the counter value has reached a user-defined threshold. If the threshold has not been reached, the counter is incremented (decremented) in block 206.

If the threshold has been reached, in block 210, the loop filter coefficients are adjusted to different values, for example higher coefficients yielding higher gains are provided. In block 212, the counter is set to zero, and the loop is returned to block 202 and run for a specified amount of time as set forth in block 214.

Referring to FIG. 6, a loop filter 300 is shown in accordance with one embodiment of the present invention. Filter 300 includes two coefficients, $K_p$ and $K_i$ in this embodiment. Other embodiment may include more coefficients and/or branches to be synchronized. $K_p$ is the gain of the proportional section of the loop filter and that section's output is a scaled version of the input error. $K_i$ is the gain of the integral section of the loop filter 300 and the output of that section is formed by scaling the input error and integrating the input error using the loop filter and a controller (see, e.g., FIG. 2).

The overall output (Loop Filter Output) of the loop filter 300 is formed by adding the outputs of the proportional and integral stages together with an adder 302. The output of the loop filter is scaled in error scaling (see, e.g., FIG. 2) and the integer part of the scaled error is used to update the receiver's code reference.

The loop filter output is the result of a comparison made by a comparator 30 between the proportional path and the integral path. The integral path output includes a comparison (made by a comparator 32) of the error signal filtered with coefficient $K_i$, and feedback of the prior comparator output from impedance 34.

While the present invention has been illustratively described having two filter coefficients, the present system may include one or more filters which may be replaced as described herein.

Having described preferred embodiments for intelligent code tracking for spread spectrum systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A code-tracking system, comprising:
   a loop filter, which receives an early/late error signal and at least one filter coefficient and outputs a loop filter error signal;
   an error scaling device, which receives the loop filter error representing an update and provides a code tracking adjustment signal;
   a controller which monitors at least one of a frequency of updates and a number of same direction updates and provides a filter coefficient (K) in accordance with at least one of the frequency of updates and the number of same direction updates.

2. The system as recited in claim 1, wherein the loop filter includes at least two filter coefficients.

3. The system as recited in claim 1, wherein the controller includes at least one counter, which counts a number of updates.

4. The system as recited in claim 1, wherein the controller includes memory and the memory stores a plurality of filter coefficients.

5. The system as recited in claim 1, wherein the controller includes memory and the memory stores a user defined threshold for comparison to a number of updates.

6. The system as recited in claim 1, wherein the early/late error signal is computed as a result of amplitude differences between early and late samples of a received signal.

7. The system as recited in claim 1, wherein the controller replaces the filter coefficients (K) with new filter coefficients to enhance code tracking and to resynchronize received signals.

8. A method for code-tracking in spread spectrum systems, comprising the steps of:
   modifying a count after each update of a loop filter output;
   comparing the count to a user-defined threshold; and
   if the count does not exceed the user-defined threshold and if a code tracking adjustment value is non-zero, changing loop filter coefficients to synchronize received signals.

9. The method as recited in claim 8, wherein the step of changing loop filter coefficients includes replacing the loop filter coefficients with larger filter coefficients to increase gain when an update frequency reaches or exceeds a threshold.

10. The method as recited in claim 8, further comprising the step of storing a plurality of filter coefficients.

11. The method as recited in claim 10, further comprising the step of replacing the filter coefficients with one or more of the plurality of filter coefficients in accordance with loop filter conditions.

12. The method as recited in claim 8, further comprising the step of computing early/late error signals as a result of amplitude differences between early and late samples of a received signal to determine updates.

13. The method as recited in claim 8, wherein the step of changing includes replacing the filter coefficients with new filter coefficients to enhance code tracking and to resynchronize received signals.

14. A method for code-tracking in spread spectrum systems, comprising the steps of:
   modifying a count after a number of same direction updates of a loop filter output;
   comparing an absolute value of the count to a user-defined threshold; and
   if the absolute value exceeds the user-defined threshold, changing loop filter coefficients.

15. The method as recited in claim 14, wherein the step of changing loop filter coefficients includes replacing the loop filter coefficients with new filter coefficients to modify gain when a number of updates in a same direction reaches or exceeds a threshold.

16. The method as recited in claim 14, further comprising the step of storing a plurality of filter coefficients.

17. The method as recited in claim 16, further comprising the step of replacing the filter coefficients with one or more of the plurality of filter coefficients in accordance with loop filter conditions.

18. The method as recited in claim 14, further comprising the step of computing early/late error signals as a result of amplitude differences between early and late samples of a spread spectrum to determine updates.

19. The method as recited in claim 14, wherein the step of changing includes replacing the filter coefficients with new filter coefficients to enhance code tracking and to resynchronize received signals.

* * * * *

UNITED STATES PATENT AND TRADEMARK OFFICE
CERTIFICATE OF CORRECTION

PATENT NO. : 7,639,732 B2  Page 1 of 1
APPLICATION NO. : 10/576966
DATED : December 29, 2009
INVENTOR(S) : Kostic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this

Ninth Day of November, 2010

David J. Kappos
*Director of the United States Patent and Trademark Office*